US011942039B1

United States Patent

(12) United States Patent
Zhou et al.

(10) Patent No.: US 11,942,039 B1
(45) Date of Patent: Mar. 26, 2024

(54) PIXEL DRIVING CIRCUIT, DRIVING METHOD THEREOF AND DISPLAY DEVICE

(71) Applicant: HKC CORPORATION LIMITED, Shenzhen (CN)

(72) Inventors: Renjie Zhou, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/330,273

(22) Filed: Jun. 6, 2023

(30) Foreign Application Priority Data

Oct. 12, 2022 (CN) ........................ 202211244269.5

(51) Int. Cl.
*G09G 3/3233* (2016.01)

(52) U.S. Cl.
CPC ..................... *G09G 3/3233* (2013.01); *G09G 2300/0819* (2013.01); *G09G 2300/0842* (2013.01); *G09G 2320/0252* (2013.01)

(58) Field of Classification Search
CPC .................. G09G 3/00; G09G 3/3233; G09G 2300/0426; G09G 2300/0852; G09G 2310/0291; G09G 2310/0294; H02H 3/08
See application file for complete search history.

(56) References Cited

U.S. PATENT DOCUMENTS

2005/0259093 A1 11/2005 Osame et al.
2008/0043005 A1 2/2008 Kanda
2023/0146320 A1* 5/2023 Hörner ................. G09G 3/2014 345/55
2023/0215358 A1* 7/2023 Park ..................... G09G 3/3233 345/76

FOREIGN PATENT DOCUMENTS

| | | |
|---|---|---|
| CN | 112669745 | 4/2021 |
| CN | 114743501 | 7/2022 |
| CN | 114822396 | 7/2022 |
| CN | 115019729 | 9/2022 |

OTHER PUBLICATIONS

CNIPA, Notification to Grant Patent Right for Invention for CN Application No. 202211244269.5, dated Nov. 16, 2022.

* cited by examiner

*Primary Examiner* — Stacy Khoo
(74) *Attorney, Agent, or Firm* — Hodgson Russ LLP

(57) ABSTRACT

A pixel driving circuit comprises a driving transistor, a storage capacitor, a trigger, a first response switch and a second response switch. The driving transistor has a first terminal connected to a power source, a second terminal connected to a light emitting unit, and a control terminal connected to the storage capacitor, and a second terminal of the storage capacitor is connected to the power source. The first response switch has a first terminal connected to a data line, a control terminal connected to a scan line, a second terminal connected to the first terminal of the storage capacitor, an input terminal of the trigger is connected to the scan line. The second response switch has a first terminal connected to the second terminal of the drive transistor, a second terminal connected to an initial voltage terminal, and a control terminal connected to an output terminal of the trigger.

17 Claims, 5 Drawing Sheets

PIXEL DRIVING CIRCUIT, DRIVING METHOD THEREOF AND DISPLAY DEVICE

CROSS-REFERENCE TO RELATED APPLICATIONS

This application claims priority to Chinese Patent Application No. 202211244269.5, filed Oct. 12, 2022, the entire contents of which are incorporated herein by reference.

TECHNICAL FIELD

The present application relates to the field of display technology, and more particularly, to a pixel driving circuit, a driving method thereof and a display device.

BACKGROUND

In the display panel, a storage capacitor is arranged in the pixel driving circuit of an AMOLED (Active-matrix organic light-emitting diode), and the existence of the storage capacitor will drive the transistor to generate a coupling capacitor. However, the existence of the coupling capacitor makes the charging time of driving the luminous capacitor longer, which leads to the delayed luminescence of the light emitting unit and slows down the response speed of the whole display panel.

SUMMARY

There are provided a pixel driving circuit, a driving method thereof, and a display device, according to embodiments of this application. The technical solution is as below:

According to a first aspect of the present application, a pixel driving circuit is provided, which includes:

a driving transistor, a first terminal of the driving transistor being connected to a power source, a second terminal of the driving transistor being connected to a light emitting unit;

a storage capacitor, a first terminal of the storage capacitor being connected to a control terminal of the driving transistor, and a second terminal of the storage capacitor being connected to the power source;

a first response switch, provided with a first terminal connected to a data line, a control terminal connected to a scan line, and a second terminal connected to the first terminal of the storage capacitor, the control terminal being configured to respond to a scan signal provided by the scan line to provide a data signal provided by the data line to the first terminal of the storage capacitor; and a trigger with an input terminal connected to the scan line, and the trigger generating a first control signal in response to the scan signal of the scan line; and a second response switch with a first terminal connected to the second terminal of the driving transistor, a second terminal connected to an initial voltage terminal, a control terminal connected to an output terminal of the trigger, wherein the control terminal of the second response switch provides a voltage of the initial voltage terminal to the second terminal of the driving transistor in response to the first control signal.

According to a second aspect of the present application, a driving method of a pixel driving circuit is further provided, which includes the pixel driving circuit comprises a driving transistor, a storage capacitor, a trigger, a first response switch and a second response switch, wherein a first terminal of the driving transistor is connected to a power source, a second terminal of the driving transistor is connected to a light emitting unit, a control terminal of the driving transistor is connected to a first terminal of the storage capacitor, and a second terminal of the storage capacitor is connected to the power source;

a first terminal of the first response switch is connected to a data line, a control terminal of the first response switch is connected to a scan line, a second terminal of the first response switch is connected to the first terminal of the storage capacitor, an input terminal of the trigger is connected to the scan line, a first terminal of the second response switch is connected to the second terminal of the driving transistor, a second terminal of the second response switch is connected to an initial voltage terminal, and a control terminal of the second response switch is connected to an output terminal of the trigger;

wherein the driving method of the pixel driving circuit comprises:

controlling the scan line to provide a scan signal, the trigger receiving the scan signal at the input terminal thereof, and the trigger generating a first control signal in response to the scan signal; and providing a voltage of the initial voltage terminal to the second terminal of the drive transistor by the control terminal of the second response switch in response to the first control signal.

According to a third aspect of the present application, a display panel is further provided, which includes a display area and a non-display area surrounding the display area, the display panel comprises a gate driving circuit disposed in the non-display area and the pixel driving circuit as described above disposed in the display area, the gate driving circuit being connected to the pixel driving circuit, and the gate driving circuit being configured for providing a scan signal to the pixel driving circuit.

It should be understood that the above general description and the following detailed description are exemplary only and are not intended to limit the present application.

BRIEF DESCRIPTION OF THE DRAWINGS

The above and other objects features and advantages of the present application will become more apparent by describing exemplary embodiments thereof in detail with reference to the accompanying drawings.

DESCRIPTION OF THE EMBODIMENTS

Figure 1:
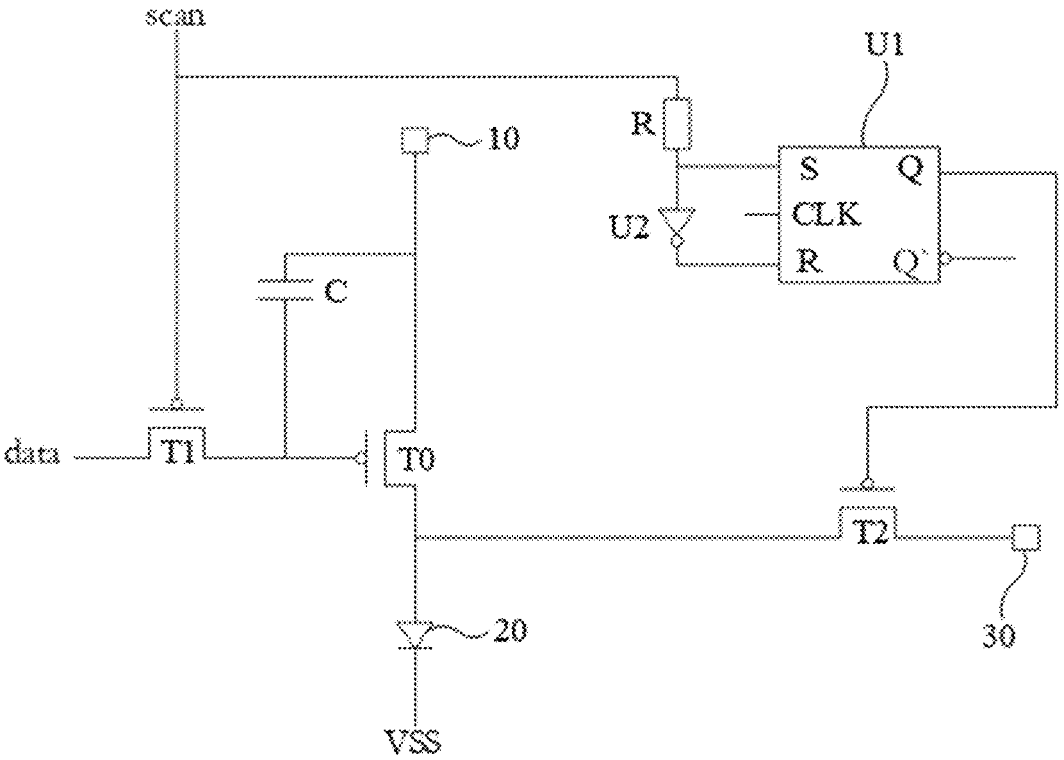
FIG. 1 is a circuit diagram of a pixel driving circuit according to a first embodiment of the present application.

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front and back) are used to explain that the structure and movement of the various elements of the present application are not absolute but relative. These descriptions are appropriate when these elements are in the positions shown in the drawings. If the description of the positions of the element changes, the indications of the directions change accordingly.

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art. The accompanying drawings are only schematic illustrations of the present application and are not necessarily drawn to scale. Like reference numerals in the figures denote identical or similar parts and thus repetitive descriptions thereof will be omitted.

The preferred embodiment of the present application is further elaborated below in conjunction with the accompanying drawings of the description.

Embodiment 1

Referring to FIG. 1, the present application provides a pixel driving circuit in which a light emitting unit 20 is provided. Under the display principle, the light emitting unit 20 may be an AMOLED (Active Matrix Organic Light Emitting Diode) or an LCD (Liquid Crystal Display). In the fabrication of pixel driving circuit, the pixel driving circuit may be fabricated by Amorphous Silicon (A-Si), indium tin oxide (IGZO), Low Temperature Poly-Silicon (LTPS) and so on.

The pixel driving circuit comprises a driving transistor T0 and a storage capacitor C. The first terminal of the driving transistor T0 is connected to a power source 10, the second terminal is connected to the light emitting unit 20, the control terminal is connected to the first terminal of the storage capacitor C, and the second terminal of the storage capacitor C is connected to the power source 10. The power source 10 is configured to supply power for lighting the light emitting unit 20. The storage capacitor C includes two electrode plates, i.e., a first electrode plate and a second electrode plate, the first electrode plate and the second electrode plate are arranged opposite each other, the first electrode plate can be understood as the first terminal, and the second electrode plate can be understood as the second terminal.

The pixel driving circuit further comprises a first response switch T1. The first response switch T1 is provided with a first terminal connected to a data line Data, a control terminal connected to a scan line Scan, and a second terminal connected to the first terminal of the storage capacitor C, the control terminal is configured to respond scan signal provided by the scan line Scan, so as to provide a data signal provided by the data line Data to the first terminal of the storage capacitor C.

When the light emitting unit 20 is driven to be lightened, the scan line Scan transmits the scan signal to the first response switch T1. After the control terminal of the first response switch T1 receives the scan signal, the first terminal and the second terminal of the first response switch T1 are turned on, and the data line Data provides a data signal to the first response switch T1. When the first terminal and the second terminal of the first response switch T1 are turned on, the data signal is provided to the first terminal of the storage capacitor C through the first response switch T1, and the data signal can directly enable the storage capacitor C to be charged, thereby affecting the voltage stored in the storage capacitor C, and further controlling the on or off of the driving transistor T0.

The storage capacitor C is configured to be prestored a voltage, and the voltage which is prestored can be associated with the threshold voltage of the driving transistor T0, so that when the light emitting unit 20 is lightened, the storage voltage stored in the storage capacitor C and the threshold voltage of the driving transistor T0 can cancel each other, so as to avoid the threshold voltage of the driving transistor T0 affecting the lighting of the light emitting unit 20. For example, the storage capacitor C is charged in advance through the power source 10 or the data line data until the drive transistor T0 is turned on, and then the charging process for the storage capacitor C is closed. The storage capacitor C starts to discharge continuously, and the capacity gradually decreases. If the capacity stored in the storage capacitor C just meets the shutdown of the driving transistor T0, the voltage stored in the storage capacitor C may be equal to the threshold voltage of the driving transistor T0.

The pixel driving circuit further includes a trigger U1 and a second response switch T2. An input terminal of the trigger U1 is connected to a scan line Scan, and the trigger U1 generates a first control signal in response to a scan signal of the scan line Scan. The first terminal of the second response switch T2 is connected to the second terminal of the driving transistor T0, the second terminal of the second response switch T2 is connected to the initial voltage terminal 30, the control terminal of the second response switch T2 is connected to the output terminal of the trigger U1, and the control terminal of the second response switch T2 provides the voltage at the initial voltage terminal 30 to the second terminal of the driving transistor T0 in response to the first control signal. The voltage of the initial voltage terminal is lower than a threshold voltage of the light emitting unit 20.

In the technical solution of the embodiment, the scan line Scan provides a scan signal, the control terminal of the first response switch T1 responds to the scan signal, the first terminal and the second terminal of the first response switch T1 are turned on, and the data signal provided by the data line Data is provided to the first terminal of the storage capacitor through the first response switch T1. The second terminal of the storage capacitor C is connected to the power source 10, and under the joint action of the voltage of the power source 10 and the voltage of the data signal, the driving transistor T0 is turned on. In this way, the voltage at the power source 10 can be output to the light emitting unit 20 through the driving transistor T0 to ensure that the light emitting unit 20 is lightened. The trigger U1 generates a first control signal upon receiving the scan signal at the input terminal, and the first control signal is transmitted to the second response switch T2. The control terminal of the second response switch T2 responds to the first control signal to turn on the first and second terminals of the second response switch T2. Thus, the voltage at the initial voltage terminal 30 is provided to the second terminal of the driving transistor through the second response switch T2. The voltage initialization of the second terminal of the driving transistor T0 is completed, which reduces the coupling capacitance or even eliminates the existence of the coupling capacitance, thereby reducing the delayed luminescence of the light emitting unit 20 and improving the response speed of the whole display panel 40.

The arrangement of the trigger U1 achieves the voltage initialization of the driving transistor T0 without adding an additional circuit. By using the existing scan line Scan, the trigger U1 receives the scan signal of the scan line Scan to generate a first control signal, and the initial voltage terminal 30 is controlled by the first control signal. That is, one scan line Scan can control the turning on of the first response switch T1 and can also synchronously control the turning on of the second response switch T2.

The input terminal of the trigger U1 comprises a first input terminal and a second input terminal, the first input terminal and the second input terminal are both connected to the scan line Scan. The pixel driving circuit further includes an inverter U2, one terminal of the inverter U2 is connected to the second input terminal, and another terminal of which is connected to the scan line Scan. The signal flowing to the second input terminal will first pass through the inverter, and the inverter U2 is used to invert the phase of the scan signal by 180 degrees. This ensures that the signals received by the first input terminal and the second input terminal are different, thus ensuring the smooth operation of the trigger U1. For example, if the signal received at the first input terminal is 0, the signal received at the second input terminal is 1. On the contrary, if the signal received at the first input terminal is 1, the signal received at the second input terminal is 0.

In order to prevent the signal voltage received by the trigger U1 from being too large, the pixel driving circuit further comprises a current limiting resistor R, one terminal of the current limiting resistor R is connected to the scan line Scan, and another terminal thereof is respectively connected to the inverter U2 and the first input terminal. That is to say, before the scan signal flows to the first input terminal and the second input terminal of the trigger U1, the scan signal passes through the current limiting resistor R, and through the sharing of the current limiting resistor R, the current values of the first input terminal and the second input terminal are reduced, and the breakdown of the trigger U1 caused by excessive current is avoided.

In the related art, the light emitting unit 20 is susceptible to the external environment, resulting in the brightness of the light emitting unit 20 being inconsistent and even having a flicker condition after shutdown.

Figure 2:
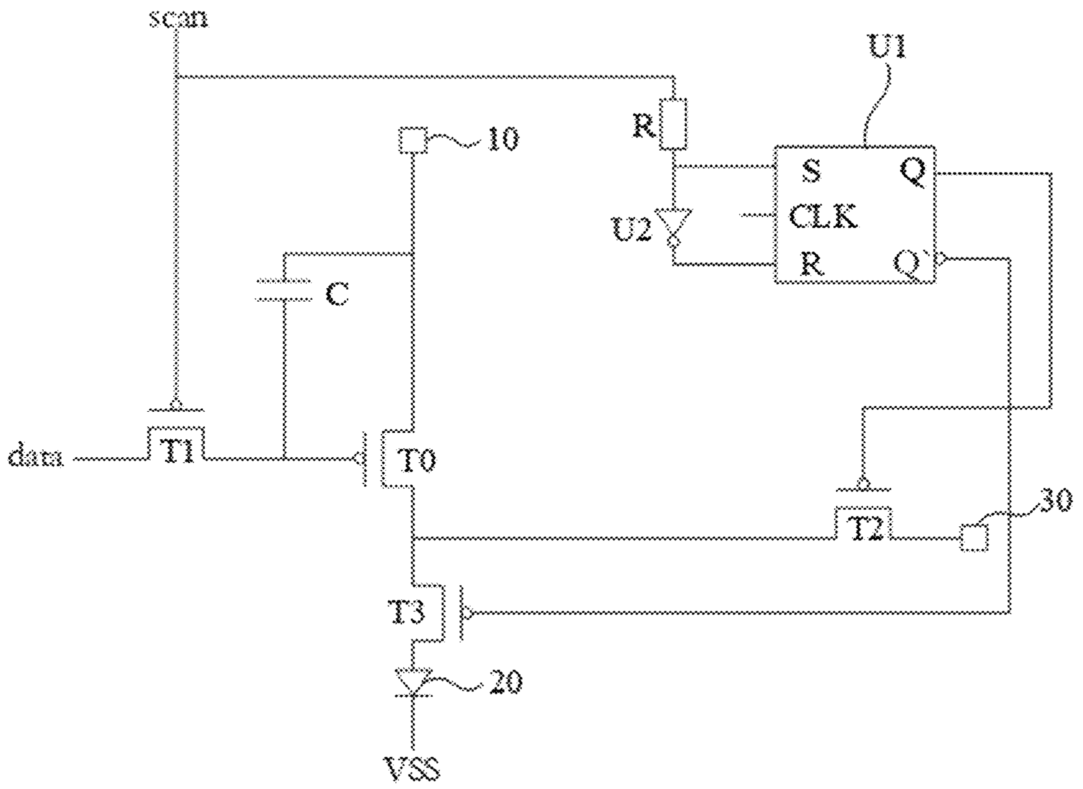
FIG. 2 is a circuit diagram of the pixel driving circuit in FIG. 1 provided with a third response switch according to the present application.

Referring to FIG. 2, for this purpose, the pixel driving circuit further includes a third response switch T3, the first terminal of the third response switch T3 is connected to the first terminal of the second response switch T2, and the second terminal of the third response switch T3 is connected to the light emitting unit 20.

The output terminal of the trigger U1 comprises a first output terminal for providing a first control signal and a second output terminal for providing a second control signal. The second output terminal is connected to a control terminal of the third response switch T3, and the control terminal of the third response switch T3 responds to the second control signal to turn on the first and second terminals of the third response switch T3.

The first control signal and the second control signal are both generated on the basis of the scan signal. The first control signal comes from the first output terminal and the second control signal comes from the second output terminal. The signals of the first output terminal and the second output terminal are different. If the first control signal is a low level signal, the second control signal is a high level signal. If the first control signal is a high level signal, the second control signal is a low level signal.

Thus, when initializing the driving transistor T0, the first control signal is at a low level, the control terminal of the second response switch T2 responds to the first control signal at the low level, the first terminal and the second terminal of the second response switch T2 are turned on, and the voltage of the initial voltage terminal 30 is output to the second terminal of the driving transistor T0, thereby completing the initialization of the driving transistor T0.

Meanwhile, when the second control signal is at a high level, the control terminal of the third response switch T3 is turned off based on the second control signal at a high level, and the first terminal and the second terminal of the third response switch T3 are turned off. An anode of the light emitting unit 20 is disconnected from the driving transistor T0, and the light emitting unit 20 is not affected by the external environment. Any of the initial voltage terminal 30, the power source 10 and the storage capacitor C is disconnected from the light emitting unit 20. In this way, none of the voltage of the initial voltage terminal 30, the voltage of the power source 10 and the voltage stored in the storage capacitor C can be applied to the light emitting unit 20, thus ensuring that the light emitting unit 20 presents a unified black display at this time and avoiding the situation of flashing screen.

Therefore, in the technical solution, the data signal transmission can be completed through the scan line Scan matched with the trigger U1, and the initialization of the driving transistor T0 can be completed by controlling the second response switch T2, and the light emitting unit 20 is disconnected from the external environment by controlling the third response switch T3, so as to ensure that the light emitting unit 20 presents a uniform black display when it does not need to emit light. That is, one scan line can control the on and off of three response switches, which simplifies the circuit design.

Further, the trigger U1 is an SR (Set-and-Reset) trigger U1, the first input terminal is an S input terminal, the second input terminal is an R input terminal, the first output terminal is a Q output terminal, and the second output terminal is a Q' output terminal.

In this embodiment, the inverter U2 is provided so that the signals received at the first input terminal and the second input terminal are reversed. For example, if the S input terminal receives a 0 signal denoting a low level, the R input terminal receives a 1 signal, and the Q output terminal is at a low level, that is, the first control signal is at a low level. In response to the low level of the Q output terminal, the control terminal of the second response switch T2 turned on the first terminal and the second terminal. The Q' output terminal outputs a high level signal, i.e., the second control signal is at a high level, the control terminal of the third response switch T3 turns off the first terminal and the second terminal in response to the high level signal output by the Q' output terminal. The SR trigger is also provided with a clock signal terminal CLK, and the clock signal terminal CLK is used for receiving a clock pulse signal and controlling the turning on of the SR trigger.

It should be emphasized that the present application can control the turn-on time of the SR trigger through the clock pulse signal, so as to flexibly control the turn-on time of the second response switch T2. This avoids the situation where after the storage capacitor C is charged, the driving transistor T0 is turned on, which affects the initialization of the anode of the light emitting unit 20.

In addition, the arrangement of the SR trigger can make ensure that the low level signal output at the Q output terminal is applicable to the second response switch T2. Typically, the gate driving voltage required for turning on the second response switch T2 is smaller than the gate driving voltage of the first response switch T1, thereby less control circuits and reducing costs.

In order to ensure that the response switch effectively responds to the corresponding control signal, the drive transistor T0, the first response switch T1, the second response switch T2 and the third response switch T3 are all P-type transistors. That is to say, the first response switch T1, the second response switch T2 and the third response switch T3 are of the same model, i.e., they are all P-type field-effect transistors (FETs). After receiving the low-level signal, the control terminal of the P-type FET tunes on the first terminal and the second terminal. After receiving the high-level signal, the control terminal of the P-type FET turns off the first terminal and the second terminal.

The first terminal of the response switch is understood as a source, and the second terminal is understood as a drain. Of course, the first terminal of the response switch can also be understood as a drain, and the second terminal can also be understood as a source. The control terminals of the response switches are grid.

The first control signal is a low level signal, and the second control signal is a high level signal. The first and second terminals of the second response switch T2 are controlled to be turned on by a low level signal of the first control signal, and the first and second terminals of the third response switch T3 are controlled to be turned off by a high level signal of the second control signal.

Of course, the first and second response switches T1 and T2 and the third response switch T3 may also be N-type FET. The N-type FET responses to the high level signal, the control terminal of the N-type FET receives the high level signal, and the first and second terminals of the N-type FET are turned on. The control terminal of the N-type FET receives a low level signal, the first and second terminals of the N-type FET are turned off.

Figure 3:
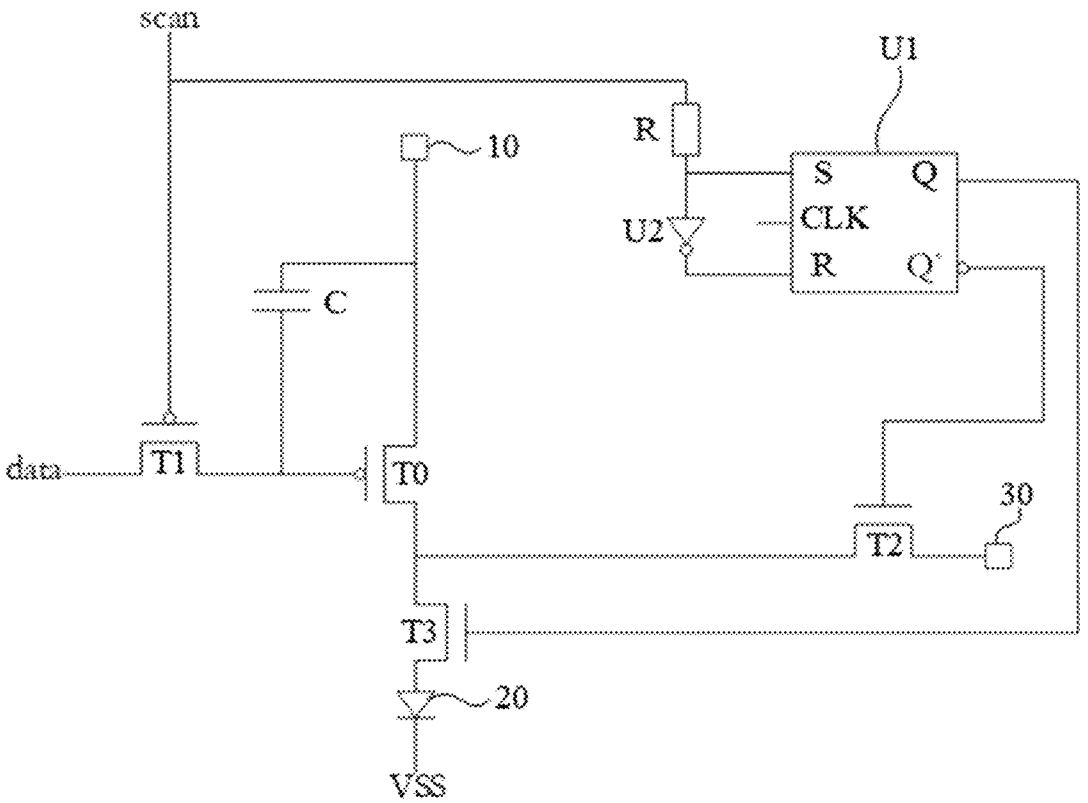
FIG. 3 shows another connection mode of the third response switch in the pixel driving circuit of FIG. 2 according to the present application.

Referring to FIG. 3, the driving transistor T0 and the first response switch T1 may be provided as P-type FET, and the second response switch T2 and the third response switch T3 may be provided as N-type FETs. At this time, the control terminal of the second response switch T2 is connected to the second output terminal, that is, the Q' output terminal. The high level of the second control signal is output to the control terminal of the second response switch T2, the first terminal and the second terminal of the second response switch T2 are turned on, and the voltage of the second terminal of the drive transistor T0 is initialized.

The control terminal of the third response switch T3 is connected to the first output terminal, that is, the Q output terminal. The low level of the first control signal is output to the control terminal of the third response switch T3, and the first and second terminals of the third response switch T3 are turned off, so that the light emitting unit 20 is disconnected from the external environment.

Embodiment 2

Figure 4:
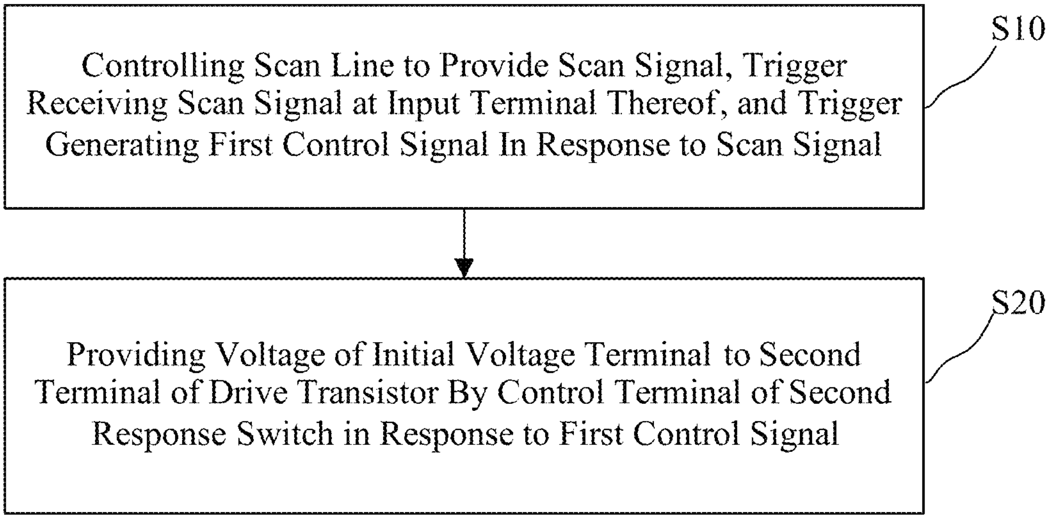
FIG. 4 is a flow chart of a driving method of the pixel driving circuit according to a second embodiment of the present application.

Referring to FIG. 4, the present application also provides a driving method of a pixel driving circuit. The pixel driving circuit comprises a driving transistor T0 and a storage capacitor C, a trigger U1, a first response switch T1 and a second response switch T2. A first terminal of the driving transistor T0 is connected to a power source 10, a second terminal of the driving transistor is connected to a light emitting unit 20, a control terminal of the driving transistor is connected to the first terminal of the storage capacitor C, and a second terminal of the storage capacitor C is connected to the power source 10.

A first terminal of the first response switch T1 is connected to a data line Data, a control terminal of the first response switch T1 is connected to a scan line Scan, a second terminal of the first response switch is connected to the first terminal of the storage capacitor C, an input terminal of the trigger U1 is connected to the scan line Scan, a first terminal of the second response switch T2 is connected to the second terminal of the driving transistor T0, a second terminal of the second response switch T2 is connected to an initial voltage terminal 30, and a control terminal of the second response switch T2 is connected to an output terminal of the trigger U1.

The driving method of the pixel driving circuit comprises:

Step S10, controlling the scan line Scan to provide a scan signal, the trigger U1 receiving the scan signal at the input terminal thereof, and generating a first control signal in response to the scan signal; and Step S20, providing a voltage of the initial voltage terminal 30 to the second terminal of the drive transistor T0 by the control terminal of the second response switch T2 in response to the first control signal.

The control terminal of the first response switch T1 responds to the scan signal provided by the scan line Scan, the first terminal and the second terminal of the first response switch T1 are turned on, and the data signal provided by the data line Data is supplied to the first terminal of the storage capacitor C through the first response switch T1. The second terminal of the storage capacitor C is connected to the power source 10, and under the joint action of the voltage of the power source 10 and the voltage of the data signal, the driving transistor T0 is turned on. In this way, the voltage at the power source 10 can be output to the light emitting unit 20 through the driving transistor T0 to ensure that the light emitting unit 20 is lightened. The trigger U1 generates a first control signal upon receiving the scan signal at the input terminal, and the first control signal is transmitted to the second response switch T2. The control terminal of the second response switch T2 responds to the first control signal to turn on the first and second terminals of the second response switch T2. Thus, the voltage at the initial voltage terminal 30 is provided to the second terminal of the driving transistor through the second response switch T2. The voltage initialization of the second terminal of the driving transistor T0 is completed, which reduces the coupling capacitance or even eliminates the existence of the coupling capacitance, thereby reducing the delayed luminescence of the light emitting unit 20 and improving the response speed of the whole display panel 40.

Figure 5:
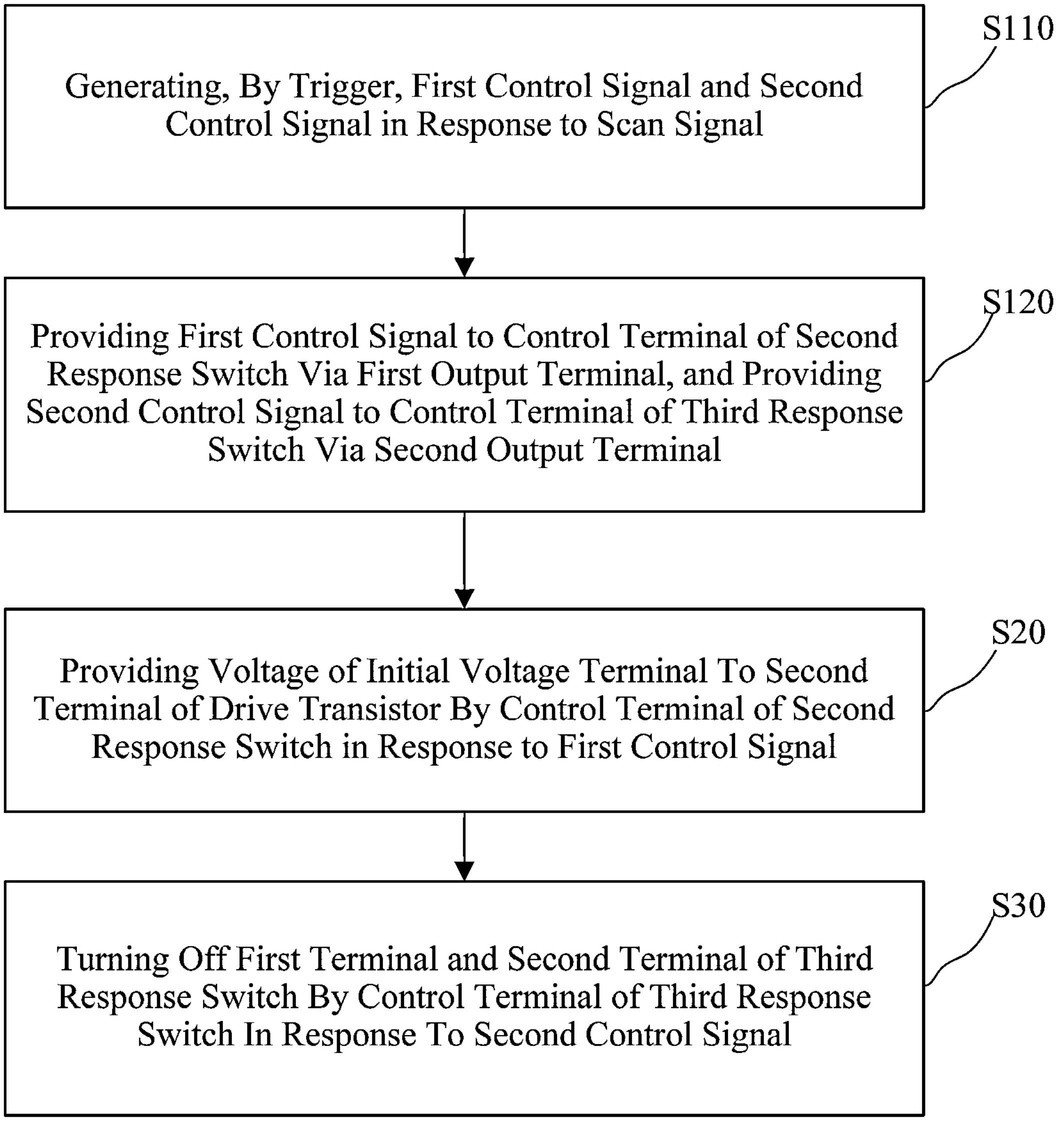
FIG. 5 is a flow chart of step S30 of the driving method of the pixel driving circuit according to the present application.

Referring to FIG. 5, the pixel driving circuit further comprises a third response switch T3, the first terminal of the third response switch T3 is connected to the first terminal of second response switch T2, and a second terminal of third response switch T3 is connected to emitting unit 20; the output terminal of the trigger U1 comprises a first output terminal and a second output terminal, the first output terminal is connected to the control terminal of the second response switch T2, and the second output terminal is connected to a control terminal of the third response switch T3.

The step of generating a first control signal by the trigger U1 in response to the scan signal comprises:

Step S110, generating, by the trigger U1, the first control signal and a second control signal in response to the scan signal; and Step S120, providing the first control signal to the control terminal of the second response switch T2 via the first output terminal, and providing the second control signal to the control terminal of the third response switch T3 via the second output terminal.

Following the step of generating a first control signal by the trigger U1 in response to the scan signal, the method comprises:

Step S30, turning off the first terminal and second terminal of the third response switch T3 by the control terminal of the third response switch T3 in response to the second control signal.

The driving transistor T0, the first response switch T1, the second response switch T2 and the third response switch T3 are all P-type field effect transistors. Thus, when initializing the driving transistor T0, the first control signal is at a low level, the control terminal of the second response switch T2 responds to the first control signal at the low level, the first terminal and the second terminal of the second response switch T2 are turned on, and the voltage of the initial voltage terminal 30 is output to the second terminal of the driving transistor T0, thereby completing the initialization of the driving transistor T0.

Meanwhile, when the second control signal is at a high level, the control terminal of the third response switch T3 is turned off based on the second control signal at a high level, and the first terminal and the second terminal of the third response switch T3 are turned off. An anode of the light emitting unit 20 is disconnected from the driving transistor T0, and the light emitting unit 20 is not affected by the external environment. Any one of the initial voltage terminal 30, the power source 10 and the storage capacitor C is disconnected from the light emitting unit 20. In this way, none of the voltage of the initial voltage terminal 30, the voltage of the power source 10 and the voltage stored in the storage capacitor C can be applied to the light emitting unit 20, thus ensuring that the light emitting unit 20 presents a unified black display at this time and avoiding the situation of flashing screen.

Embodiment 3

Figure 6:
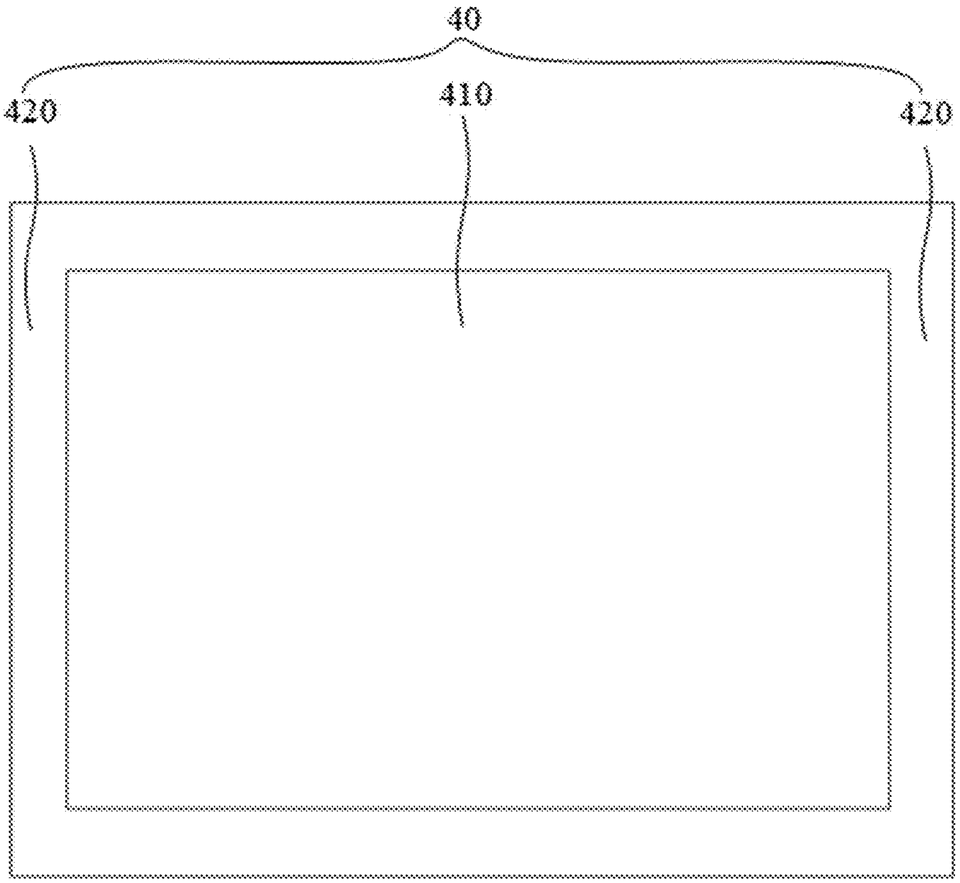
FIG. 6 is a structural schematic diagram of a display panel according to a third embodiment of the present application.

Referring to FIG. 6, the present application also provides a display panel 40. The display panel 40 includes a display area 410 and a non-display area 420 surrounding the display area 410. The display panel 40 comprises a gate driving circuit disposed in the non-display area 420 and the pixel driving circuit as described above disposed in the display area 410, the gate driving circuit is connected to the pixel driving circuit, and the gate driving circuit is configured to provide a scan signal to the pixel driving circuit. The gate driving circuit is disposed in the non-display area 420 so that interference to the display screen can be avoided.

The pixel driving circuit comprises a driving transistor T0 and a storage capacitor C. The first terminal of the driving transistor T0 is connected to a power source 10, the second terminal is connected to the light emitting unit 20, the control terminal is connected to the first terminal of the storage capacitor C, and the second terminal of the storage capacitor C is connected to the power source 10. The power source 10 is used for supplying power for lighting the light emitting unit 20. The storage capacitor C includes two electrode plates, i.e., a first electrode plate and a second electrode plate, the first electrode plate and the second electrode plate are arranged opposite each other, the first electrode plate can be understood as the first terminal, and the second electrode plate can be understood as the second terminal.

The pixel driving circuit further comprises a first response switch T1. The first response switch T1 is provided with a first terminal connected to a data line Data, a control terminal connected to a scan line Scan, and a second terminal connected to the first terminal of the storage capacitor C, the control terminal is configured to respond scan signal provided by the scan line Scan, so as to provide a data signal provided by the data line Data to the first terminal of the storage capacitor C.

When the driving light emitting unit 20 is lightened, the scan line Scan transmits the scan signal to the first response switch T1. After the control terminal of the first response switch T1 receives the scan signal, the first terminal and the second terminal of the first response switch T1 are turned on, and the data line Data provides a data signal to the first response switch T1. When the first terminal and the second terminal of the first response switch T1 are turned on, the data signal is provided to the first terminal of the storage capacitor C through the first response switch T1, and the data signal can directly enable the storage capacitor C to be charged, thereby affecting the voltage stored in the storage capacitor C, and further controlling the on or off of the driving transistor T0.

The storage capacitor C is configured to be prestored a voltage, and the voltage which is prestored can be associated with the threshold voltage of the driving transistor T0, so that when the light emitting unit 20 is lightened, the storage voltage stored in the storage capacitor C and the threshold voltage of the driving transistor T0 can cancel each other, so as to avoid the threshold voltage of the driving transistor T0 affecting the lighting of the light emitting unit 20. For example, the storage capacitor C is charged in advance through the power source 10 or the data line data until the drive transistor T0 is turned on, and then the charging process for the storage capacitor C is closed. The storage capacitor C starts to discharge continuously, and the capacity gradually decreases. If the capacity stored in the storage capacitor C just meets the shutdown of the driving transistor T0, the voltage stored in the storage capacitor C can be equal to the threshold voltage of the driving transistor T0.

The pixel driving circuit further includes a trigger U1 and a second response switch T2. An input terminal of the trigger U1 is connected to a scan line Scan, and the trigger U1 generates a first control signal in response to a scan signal of the scan line Scan. The first terminal of the second response switch T2 is connected to the second terminal of the driving transistor T0, the second terminal of the second response switch T2 is connected to the initial voltage terminal 30, the control terminal of the second response switch T2 is connected to the output terminal of the trigger U1, and the control terminal of the second response switch T2 provides the voltage at the initial voltage terminal 30 to the second terminal of the driving transistor T0 in response to the first control signal. The voltage of the initial voltage terminal 30 is lower than a threshold voltage of the light emitting unit 20.

In the technical solution of the embodiment, the scan line Scan provides a scan signal, the control terminal of the first response switch T1 responds C to the scan signal, the first terminal and the second terminal of the first response switch T1 are turned on, and the data signal provided by the data line Data is provided to the first terminal of the storage capacitor through the first response switch T1. The second terminal of the storage capacitor C is connected to the power source 10, and under the joint action of the voltage of the power source 10 and the voltage of the data signal, the driving transistor T0 is turned on. In this way, the voltage at the power source 10 can be output to the light emitting unit 20 through the driving transistor T0 to ensure that the light emitting unit 20 is lightened. The trigger U1 generates a first control signal upon receiving the scan signal at the input terminal, and the first control signal is transmitted to the second response switch T2. The control terminal of the second response switch T2 responds to the first control signal to turn on the first and second terminals of the second response switch T2. Thus, the voltage at the initial voltage terminal 30 is provided to the second terminal of the driving transistor through the second response switch T2. The voltage initialization of the second terminal of the driving transistor T0 is completed, which reduces the coupling capacitance or even eliminates the existence of the coupling capacitance, thereby reducing the delayed luminescence of the light emitting unit 20 and improving the response speed of the whole display panel 40.

In addition, in this embodiment, the pixel driving circuit may be integrally provided in the display area 410 or partially provided in the non-display area 420. For example, the light emitting unit 20 is provided in the display area 410 and components other than the light emitting unit 20 are provided in the non-display area 420.

While the present application has been described with reference to several exemplary embodiments, it should be understood that the terms used are illustrative and exemplary and are not limiting. Since the present application can be embodied in various forms without departing from the spirit or essence of the present application, it should therefore be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A pixel driving circuit comprising:

a driving transistor, a first terminal of the driving transistor being connected to a power source, a second terminal of the driving transistor being connected to a light emitting unit;

a storage capacitor, a first terminal of the storage capacitor being connected to a control terminal of the driving transistor, and a second terminal of the storage capacitor being connected to the power source;

a first response switch, provided with a first terminal connected to a data line, a control terminal connected to a scan line, and a second terminal connected to the first terminal of the storage capacitor, the control terminal of the first response switch being configured to respond to a scan signal provided by the scan line to provide a data signal provided by the data line to the first terminal of the storage capacitor;

a trigger with an input terminal connected to the scan line, and the trigger generating a first control signal in response to the scan signal of the scan line; and a second response switch with a first terminal connected to the second terminal of the driving transistor, a second terminal connected to an initial voltage terminal, a control terminal connected to an output terminal of the trigger, wherein the control terminal of the second response switch provides a voltage of the initial voltage terminal to the second terminal of the driving transistor in response to the first control signal;

wherein the input terminal of the trigger comprises a first input terminal and a second input terminal, and the first input terminal and the second input terminal being connected to the scan line; and wherein the pixel driving circuit further comprises an inverter, one terminal of the inverter being connected to the second input terminal, and another terminal of the inverter being connected to the scan line.

2. The pixel driving circuit according to claim 1, wherein the pixel driving circuit further comprises a current limiting resistor, one terminal of the current limiting resistor being connected to the scan line, and another terminal of the current limiting resistor being connected to the inverter and the first input terminal.

3. The pixel driving circuit according to claim 1, wherein the pixel driving circuit further comprises a third response switch, a first terminal of the third response switch being connected to the first terminal of the second response switch, and a second terminal of the third response switch being connected to the light emitting unit; and wherein the output terminal of the trigger comprises a first output terminal for providing the first control signal and a second output terminal for providing a second control signal, the second output terminal being connected to a control terminal of the third response switch, the control terminal of the third response switch turning on the first terminal and the second terminal of the third response switch in response to the second control signal.

4. The pixel driving circuit according to claim 3, wherein the trigger is a Set-and-Reset trigger, the first input terminal is an S input terminal, the second input terminal is an R input terminal, the first output terminal is a Q output terminal, and the second output terminal is a Q' output terminal.

5. The pixel driving circuit according to claim 3, wherein the first response switch, the second response switch and the third response switch are P-type tubes.

6. The pixel driving circuit according to claim 5, wherein the first control signal is a low level signal, and the second control signal is a high level signal.

7. The pixel driving circuit according to claim 1, wherein a gate driving voltage required for turning on the second response switch is smaller than a gate driving voltage of the first response switch.

8. The pixel driving circuit according to claim 1, wherein the voltage of the initial voltage terminal is lower than a threshold voltage of the light emitting unit.

9. A driving method of a pixel driving circuit, wherein the pixel driving circuit comprises a driving transistor, a storage capacitor, a trigger, a first response switch and a second response switch, wherein a first terminal of the driving transistor is connected to a power source, a second terminal of the driving transistor is connected to a light emitting unit, a control terminal of the driving transistor is connected to a first terminal of the storage capacitor, and a second terminal of the storage capacitor is connected to the power source;

wherein a first terminal of the first response switch is connected to a data line, a control terminal of the first response switch is connected to a scan line, a second terminal of the first response switch is connected to the first terminal of the storage capacitor, an input terminal of the trigger is connected to the scan line, a first terminal of the second response switch is connected to the second terminal of the driving transistor, a second terminal of the second response switch is connected to an initial voltage terminal, and a control terminal of the second response switch is connected to an output terminal of the trigger;

wherein the pixel driving circuit further comprises a third response switch, a first terminal of the third response switch being connected to the first terminal of the second response switch, and a second terminal of the third response switch being connected to the light emitting unit and wherein the output terminal of the trigger comprises a first output terminal and a second output terminal, the first output terminal being connected to the control terminal of the second response switch, and the second output terminal being connected to a control terminal of the third response switch;

wherein the driving method of the pixel driving circuit comprises:

controlling the scan line to provide a scan signal, the trigger receiving the scan signal at the input terminal thereof, and the trigger generating a first control signal in response to the scan signal; and providing a voltage of the initial voltage terminal to the second terminal of the drive transistor by the control terminal of the second response switch in response to the first control signal;

wherein generating the first control signal by the trigger in response to the scan signal comprises:

generating, by the trigger, the first control signal and a second control signal in response to the scan signal; and providing the first control signal to the control terminal of the second response switch via the first output terminal, and providing the second control signal to the control terminal of the third response switch via the second output terminal; and wherein after the step of generating, by the trigger, a first control signal in response to the scan signal, the method comprises:

turning off the first terminal and second terminal of the third response switch by the control terminal of the third response switch in response to the second control signal.

10. A display panel comprising:

a display area and a non-display area surrounding the display area, wherein the display panel comprises a gate driving circuit disposed in the non-display area and a pixel driving circuit disposed in the display area, the gate driving circuit being connected to the pixel driving circuit, and the gate driving circuit being configured for providing a scan signal to the pixel driving circuit;

wherein pixel driving circuit comprises:

a driving transistor, a first terminal of the driving transistor being connected to a power source, a second terminal of the driving transistor being connected to a light emitting unit;

a storage capacitor, a first terminal of the storage capacitor being connected to a control terminal of the driving transistor, and a second terminal of the storage capacitor being connected to the power source;

a first response switch, provided with a first terminal connected to a data line, a control terminal connected to a scan line, and a second terminal connected to the first terminal of the storage capacitor, the control terminal of the first response switch being configured to respond to a scan signal provided by the scan line to provide a data signal provided by the data line to the first terminal of the storage capacitor;

a trigger with an input terminal connected to the scan line, and the trigger generating a first control signal in response to the scan signal of the scan line; and a second response switch with a first terminal connected to the second terminal of the driving transistor, a second terminal connected to an initial voltage terminal, a control terminal connected to an output terminal of the trigger, wherein the control terminal of the second response switch provides a voltage of the initial voltage terminal to the second terminal of the driving transistor in response to the first control signal;

wherein the input terminal of the trigger comprises a first input terminal and a second input terminal, and the first input terminal and the second input terminal being connected to the scan line; and wherein the pixel driving circuit further comprises an inverter, one terminal of the inverter being connected to the second input terminal, and another terminal of the inverter being connected to the scan line.

11. The display panel according to claim 10, wherein the pixel driving circuit further comprises a current limiting resistor, one terminal of the current limiting resistor being connected to the scan line, and another terminal of the current limiting resistor being connected to the inverter and the first input terminal.

12. The display panel according to claim 10, wherein the pixel driving circuit further comprises a third response switch, a first terminal of the third response switch being connected to the first terminal of the second response switch, and a second terminal of the third response switch being connected to the light emitting unit; and wherein the output terminal of the trigger comprises a first output terminal for providing the first control signal and a second output terminal for providing a second control signal, the second output terminal being connected to a control terminal of the third response switch, the control terminal of the third response switch turning on the first terminal and the second terminal of the third response switch in response to the second control signal.

13. The display panel according to claim 12, wherein the trigger is a Set-and-Reset trigger, the first input terminal is an S input terminal, the second input terminal is an R input terminal, the first output terminal is a Q output terminal, and the second output terminal is a Q' output terminal.

14. The display panel according to claim 12, wherein the first response switch, the second response switch and the third response switch are P-type tubes.

15. The display panel according to claim 14, wherein the first control signal is a low level signal, and the second control signal is a high level signal.

16. The display panel according to claim 10, wherein a gate driving voltage required for turning on the second response switch is smaller than a gate driving voltage of the first response switch.

17. The display panel according to claim 10, wherein the voltage of the initial voltage terminal is lower than a threshold voltage of the light emitting unit.

* * * * *